(12) United States Patent
Eom et al.

(10) Patent No.: US 6,307,639 B1
(45) Date of Patent: Oct. 23, 2001

(54) DATA TRANSMISSION/RECEPTION DEVICE USING AN ELECTROPHOTOGRAPHIC DEVELOPMENT PROCESS AND A METHOD THEREOF

(75) Inventors: Yoon-Seop Eom, Suwon; Chang-Sub Lee, Seoul; Dong-Ho Lee, Suwon, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/377,532

(22) Filed: Jan. 23, 1995

(30) Foreign Application Priority Data

Jan. 21, 1994 (KR) .................................................. 94-1123

(51) Int. Cl.[7] ........................... H04N 1/32; H04N 1/327; H04N 1/333
(52) U.S. Cl. ...................... 358/1.13; 358/1.15; 358/442; 358/468
(58) Field of Search .................................... 358/442, 468, 358/1.15, 1.13, 434; 395/114, 112

(56) References Cited

U.S. PATENT DOCUMENTS

| | | |
|---|---|---|
| 4,652,933 * | 3/1987 | Koshiishi .............................. 358/442 |
| 4,876,606 | 10/1989 | Banno et al. . |
| 4,922,348 | 5/1990 | Gillon et al. . |
| 4,930,017 | 5/1990 | Izawa . |
| 4,964,154 | 10/1990 | Shimotono . |
| 4,991,200 | 2/1991 | Lin . |
| 5,008,926 | 4/1991 | Misholi . |
| 5,018,080 | 5/1991 | Inoue . |
| 5,041,918 | 8/1991 | Ishida et al. . |
| 5,091,790 | 2/1992 | Silverberg . |
| 5,200,830 | 4/1993 | Imaizumi et al. . |
| 5,228,128 | 7/1993 | Kim . |
| 5,235,674 | 8/1993 | Cohen-Skalli et al. . |
| 5,280,585 | 1/1994 | Kochis et al. . |
| 5,303,067 | 4/1994 | Kang et al. . |
| 5,383,030 * | 1/1995 | Seo ....................................... 358/442 |

* cited by examiner

*Primary Examiner*—Scott Rogers
(74) *Attorney, Agent, or Firm*—Robert E. Bushnell, Esq.

(57) ABSTRACT

The present invention provides a data transmission/reception device capable of transmitting/receiving data between a host computer and a remote facsimile or a remote computer through an electrophotographic printer, having a ring detector for detecting a ring signal indicative of a facsimile reception; a modulator/demodulator for demodulating the data transferred from the remote facsimile or the remote computer and modulating the data supplied from the host computer connected to the printer, a control part for controlling the modulator/demodulator to start the facsimile reception if the ring has been detected, and transmitting the data demodulated by the modulator/demodulator to an engine control part for direct printing or to the host computer and transmitting the data supplied from the host computer to the modulator/demodulator for modulation and transmission to the remote facsimile or the remote computer; and an interface part for interfacing with the engine control part for enabling direct printing either the data supplied from the host computer or the data transferred from the remote facsimile or the remote computer, when the printer is set in a print mode.

22 Claims, 7 Drawing Sheets

DATA TRANSMISSION/RECEPTION DEVICE USING AN ELECTROPHOTOGRAPHIC DEVELOPMENT PROCESS AND A METHOD THEREOF

CROSS-REFERENCE TO RELATED APPLICATIONS

This application makes reference to, incorporates the same herein, and claims all benefits incurring under 35 USC §119 from an application for Data Transmission/Reception Device Using An Electrophographic Development Process And A Method Thereof filed in the Korea Industrial Property Office on Jan. 21, 1994 and assigned Ser. No. 1994/1123.

BACKGROUND OF THE INVENTION

1. Technical Field

The present invention relates to a data communication and image process system, and more particularly to a device for controlling data transmission/reception between electrophotographic printers from local and remote areas and a method thereof.

2. Background Art

Laser printers or LED (light emitted diode) printers for printing images or documents in response to the reception of signals from a personal computer (hereinafter, referred to as a computer) are well known. In a typical printer of this type as illustrated in U.S. Pat. No. 5,197,117 for Text Information Processing Apparatus Having Printer And Printing Dot Signal Generating Apparatus For The Same issued to Kato et al., a memory is provided for storing image signals from the computer. The computer formats the image signals in the manner required for the printer, and the printer memory is adapted to store bit mapped image pages of images prior to initiating printing. The printer then sequentially reads out from the bit mapped memory to modulate the light beam of a laser diode. The light beam of the laser diode is controlled to scan a photoconductive drum where the image is subsequently stored, developed and transferred to a recording paper in a manner conventional to electrophotographic devices.

This type of printers is different from the general printer in that it employs electrophotographic process to form images with low noise and high resolution. Such printers, however, can only function when they are directly connected to a host computer (i.e., local computer). Consequently, in order for this type of printer to communicate with a remote facility, such as a remote computer or a remote facsimile (FAX) machine via a public subscriber telephone network (PSTN), a separate facsimile machine is required as shown, for example, in U.S. Pat. No. 4,930,017 for Communication Terminal Device issued to Izawa. In Izawa '017, the separate facsimile machine is connected to the laser printer for enabling the laser printer to print facsimile information from a remote facsimile machine, or to scan the information printed on a recording paper and transmit it to a remote facsimile machine via telephone lines of the public subscriber telephone network. However, the information in a computer cannot be directly transmitted to a remote facsimile machine, unless the computer is connected to the cable of the public subscriber telephone network via an interface. The information must be first printed out on a recording paper and then scanned by a host facsimile machine and transmitted to the remote facsimile machine. Likewise, any information from a remote facsimile machine can not be directly displayed by the computer unless the computer is connected on line with the public subscriber telephone network, and must be first received and printed out by the host facsimile machine and then input into the computer. The printing and scanning procedures, however, inevitably delay the time of data transmission, and considerably increase the distortion of the transmitted information.

In Izawa '017, the separate facsimile machine used is of the general type; one that prints facsimile information on a thermosensitive recording paper having a predetermined size. Although this type of facsimile machine is most commonly used, the thermosensitive recording paper is subject to gradual image deterioration over a long period of time. In addition, the thermosensitive recording paper has smooth surface which does not receive and accommodate handwritten characters well. Moreover, the general facsimile machine is limited to operation only with the thermosensitive recording paper having a predetermined size. Consequently, the general facsimile machine is less desirable.

There are two other types of facsimile machines, however. The first type is a PP-facsimile (plain paper facsimile) machine; one that prints facsimile information on a plain, ordinary recording paper rather than printing on a thermosensitive recording paper. The second type is a PC-facsimile (personal computer facsimile) machine; one that is incorporated into a computer to provide the computer with the function of a facsimile machine by way of a facsimile transmission/reception board. In the PP-facsimile machine, the electrophotographic process is employed to form facsimile messages on a plain, ordinary recording paper. Consequently, the facsimile information formed on the recording paper has high resolution and low noise. Although the PP-facsimile machine produces facsimile messages of high resolution, it, however, requires a separate scanner for scanning and reading facsimile information formed on the recording paper if transmission to a remote facsimile machine via the public subscriber telephone network is requested. Unfortunately, if a separate scanner is installed in conjunction with the PP-facsimile machine, the cost of the PP-facsimile machine would exceed the cost of a laser printer. Moreover, the PP-facsimile machine does not have the capability to receive and print image signals from a host computer when compared with the laser printer. Further, when the scanner is used to scan and read facsimile information formed on the recording paper so as to transmit the read facsimile information to a remote facsimile machine via the public subscriber telephone network, data distortion often occurs while driven by the of the scanner. This results in the degradation of the printed facsimile messages at the receiving end of the remote facsimile machine.

The PC-facsimile machine, on the other hand, uses a computer to transmit a screen edited by the computer to the remote facility, such as a remote facsimile machine or a remote computer in the form of an image file. When serving as a facsimile machine, the computer must, however, be used in conjunction with a scanner as an input device and a printer as an output device. Any facsimile information received from the remote facility such as a remote facsimile machine is converted into a language readable by the computer and is stored in its auxiliary memory in the form of the image file for subsequent display on its monitor, or print out by the printer. The PC-facsimile has an enormous advantage in that the document transmitted via the public subscriber telephone network is quite clean except for a few errors occur during the transmission, when compared with both the general facsimile and PP-facsimile machines where most of the errors are generated when the scanner scans the document. As mentioned earlier, in order to implement the PC-facsimile, a facsimile transmission/reception board is built-in the PC as shown in U.S. Pat. No. 5,196,943 for Facsimile Information Distribution Apparatus issued to Hersee.

A typical PC-facsimile machine is shown in U.S. Pat. No. 5,228,128 for Personal Computer Facsimile Device issued to Kim, and assigned to the same assignee of this application. In Kim '128, the PC-facsimile machine is designed to, inter alia, transmit a document or an image directly to and receive the same directly from a remote facsimile machine via the public subscriber telephone network. The remote facsimile machine in Kim '128 can be another PC-facsimile machine or a general facsimile or PP-Facsimile machine. In order for the PC-facsimile to communicate with the remote general facsimile, these machines must first convert the image file being transmitted from a standard computer file format, such as ASCII, into a graphical image format compatible with the remote facsimile machine and transmit such graphical image to the remote facsimile machine. Since graphical images are much larger than standard files, the conversion requires significantly more time to print a file remotely. Also, if the remote receiving facsimile machine is also a PC-Facsimile, the file may be stored in an auxiliary memory and a user of the remote receiving facsimile machine must intervene to print the file before it is available.

To avoid the time delay conversion of a standard computer file format into a graphical image format and the user intervention, U.S. Pat. No. 5,175,762 for Remote Printing Using Facsimile issued to Kochis et al. is disclosed to reduce the printing time. The PC-facsimile of Kochis et al. '762 as well as other conventional PC-facsimiles, however, require a separate printer for output purposes; that is, a separate high resolution printer must be connected to the computer in order to observe the document on a recording paper. Moreover, in order for the PC-facsimile to receive the facsimile information transmitted via the public subscriber telephone network, the computer must always be turned on. If, for any reasons, the computer is turned off, the facsimile information transmitted cannot be received. If, the remote computer is turned on, however, its auxiliary memory is prone to receive facsimile information indiscriminately from several facsimile sources which could overload its memory capacity and possibly deny reception of potentially important facsimile information. Further, in the conventional PC-facsimile, when the computer receives or transmits the facsimile information from or to the remote facsimile machine, it typically cannot process other functions. Consequently, the user would have to wait for the computer to complete the reception or transmission of the facsimile information before he could proceed to use other functions.

As discussed above, each of the general facsimile, PP-facsimile and PC-facsimile has its own advantages and disadvantages. It is, however, necessary to develop a device that has the functions of these facsimile machines, but is economical and convenient to the user when it is incorporated into a laser printer. In recent years, many efforts have been made to facilitate and maintain high resolution facsimile communication with a host computer or between facsimile machines. One example is shown in U.S. Pat. No. 4,964,154 for Communication Adapter Device For Use with A Facsimile Device Combined With A Computer issued to Shimotono, where a discrete communication adapter is designed to connect between a computer and a host facsimile machine for enabling the computer to freely make mutual correspondence of the image formation between the computer and remote facsimile machines. Various embodiments of this communication adapter are also illustrated in U.S. Pat. No. 4,991,200 for Interface Device For The Intercommunication Of A Computer And A Facsimile Machine issued to Lin, U.S. Pat. No. 5,041,918 for Facsimile Adapter Unit issued to Ishida et al., U.S. Pat. No. 5,280,585 for Device Sharing System Using PCL Macros issued to Kochis et al. These discrete communication adapters connected between the facsimile machine and the computer are, however, costly external devices.

One way to avoid using these external communication adapters is shown in U.S. Pat. No. 5,303,067 for Computer Connection Circuit In Facsimile issued to Kang et al. In Kang et al. '067, a computer connection circuit is built-in a host facsimile machine so as to enable printing of either image signals from a host computer or facsimile information from a remote facsimile machine. In Kang et al. '067, however, image scanner and high resolution printer are still required if high quality image is produced. Another possible solution is illustrated in U.S. Pat. No. 5,091,790 for Multipurpose Computer Accessory For Facilitating Facsimile Communication issued to Silverberg, and U.S. Pat. No. 5,235,674 for Method And Device For Adapting A Printer Into An Autonomous Facsimile Apparatus issued to Cohen-Skalli et al. In both Silverberg '790 and Cohen-Skalli et al. '674, a computer accessory is incorporated in a printer to facilitate facsimile communication from a host computer. In a yet another solution is shown in U.S. Pat. No. 5,072,303 for Combined Printer And Facsimile Apparatus Which Scans Using Different Scan Rates And Dot Sizes issued to Silverberg, a laser printer is modified to perform both the computer printing function and the facsimile image printing function. In these schemes however, although the printer is capable of printing both image signals from a host computer and facsimile messages from a remote facsimile machine, the printer does not have the capability to transmit facsimile messages received from either a remote facsimile machine or a remote computer to a host computer via a public subscriber telephone network for a visual display on a computer screen in accordance with the user's selection. Moreover, the printer also lacks the capability to transmit image signals received from a host computer directly to either a remote facsimile machine for a facsimile print out or a remote computer for a direct or subsequent visual display on a remote screen. Further, these communication adapters are rather complex and costly.

SUMMARY OF THE INVENTION

It is therefore an object of the present invention to provide a simplified data transmission/reception device and method for adapting an electrophotographic printer to function as a facsimile machine without changing the structure of the printer.

It is also an object of the present invention to provide a data transmission/reception device for adapting an electrophotographic printer to function as a facsimile machine, and for enabling the printer not only to print both image signals from a host computer and facsimile messages from either a remote facsimile machine or a remote computer, but also to transmit facsimile messages received from either a remote facsimile machine or a remote computer to a host computer via a private service telephone network for a visual display on a computer screen in accordance with the user's selection.

It is further an object of the present invention to provide a data transmission/reception device for adapting an electrophotographic printer to perform a facsimile transmission/reception function and for enabling the printer not only to print image signals directly from a host computer, but also to transmit the image signals from a host computer directly to either a remote facsimile machine for printing or a remote computer, for a direct or subsequent visual display on a computer screen thereby eliminating the necessity of first printing a document, i.e., image signals from a host computer on a recording paper and then scanning the printed recording paper into a host facsimile machine in order to transfer the document to a remote facsimile machine via a private service telephone network as is required by the conventional art.

It is yet another object of the present invention to provide a data transmission/reception device for adapting an electrophotographic printer to perform a facsimile transmission/reception function, and for enabling the printer to facsimile a document, i.e., image signals directly from a host computer to either a remote facsimile machine or a remote computer via a private service telephone network without requiring a separate scanner, thereby eliminating data distortion occurring during the scanning of the document.

In a preferred embodiment of the present invention, an electrophotographic printer has an engine controller adapted to serve as either a facsimile printer or a computer printer. That is, the engine controller of the electrophotographic printer is designed to serve both as a facsimile printer and a computer printer for computer signals. The data transmission/reception device of the invention adapts the printer to perform a facsimile transmission/reception function so as to enable the printer to print computer signals received from a host computer and facsimile signals received from a remote facility, and to transmit one of the computer signals received from the host computer to said remote facility via a telephone network and the facsimile signals received from the remote facility to the host computer via the telephone network. This data transmission/reception device includes a facsimile modem unit connected to telephone lines and adapted to receive the facsimile signals transmitted from the remote facility and transmit the computer signals received from the host computer to the remote facility; a video control unit connected to cable lines of said host computer, adapted to receive and transfer the computer signals provided from the host computer to the facsimile modem unit for transmission to the remote facility via the telephone network, and adapted to transmit the facsimile signals received from the remote facility to the host computer via the cable lines; and an interface for interfacing with the engine controller to enable printing of one the computer signals received from the host computer and printing the facsimile signals received from the remote facility in dependence upon whether the printer is set in one of a print mode and a facsimile mode. Both the facsimile modem unit and the video control unit transmit the computer signals received from the host computer to the remote facility via the telephone network, and the facsimile signals received from the remote facility to the host computer via the cable lines, respectively, when the printer is set in the facsimile mode. When the printer is set in the print mode, however, both the facsimile modem unit and said video control unit are capable of transferring either the received computer signals or the received facsimile signals to the engine controller for direct printing.

The facsimile modem unit of the data transmission/reception device according the present invention includes a ring detector for detecting a ring signal indicative of an incoming facsimile reception; a first input/output part for receiving the facsimile signals transmitted from the remote facility via the telephone network, and transmitting the computer signals received from the host computer to the remote facility; a modulator/demodulator for providing demodulated facsimile signals by demodulating the facsimile signals received from the remote facility, and for providing modulated computer signals to be transmitted to the remote facility via the telephone network by modulating the computer signals received from the host computer; and an auxiliary processor for controlling the modulator/demodulator to begin demodulation of the received facsimile signals when the ring signals is detected, transferring the demodulated facsimile data to either the engine controller for printing or the video control unit for transmission to the host computer via the cable lines, and transferring the received computer signals to the modulator/demodulator for modulation and transmission to the remote facility in dependence upon whether the printer is set in one of a print mode and a facsimile mode.

The video control unit of the data transmission/reception device according the present invention includes a second input/output part for receiving computer signals from the host computer to be transmitted to the remote facility, and transmitting the facsimile signals received from the remote facility to the host computer; a first memory for storing a facsimile protocol program enabling conversion of the facsimile signals received from the remote facility into image signals compatible for transmission to the host computer and enabling conversion of the computer signals received from the host computer into image signals compatible for transmission to the remote facility; a second memory for storing the image signals; a main processor for controlling operation of the video control unit; and an interface part for interfacing with the engine controller for enabling printing the computer signals directly from the host computer and the facsimile signals directly from the remote facility when the printer is set in the print mode in response to either detection of the ring signal or reception of the computer signals from the host computer.

In order to achieve these and others objects, one preferred embodiment of the present invention provides a method for transferring facsimile data in a printer between a host computer and either a remote computer or a remote facsimile machine via a telephone network. The method comprises the steps of detecting a ring signal indicative of an incoming facsimile data transmitted from one of the remote computer and the remote facsimile machine; receiving facsimile data transmitted from one of the remote computer and the remote facsimile machine; determining whether the printer is set in one of a print mode and a facsimile mode; printing received facsimile data when the printer is set in the print mode; and transferring the received facsimile data to the host computer when the printer is set in the facsimile mode. According to the above method, the operation of the host computer is checked prior to the transferring the received facsimile data when the printer is set in the facsimile mode. In the event when the host computer is not in a normal operation, the received facsimile data is printed even if the printer is set in the facsimile mode.

To further achieve the above objects, another preferred embodiment of the present invention provides a method for transferring computer data in a printer between a host computer and either a remote computer or a remote facsimile machine. The method comprises the steps of receiving computer data from the host computer for either printing or transmission to one of the remote computer and the remote facsimile machine; determining whether the printer is set in one of a print mode and a facsimile mode; printing received computer data when the printer is set in the print mode; fascimiling the received computer data to one of the remote computer and the remote facsimile machine in accordance with an input telephone number when the printer is set in the facsimile mode After the telephone number is input for facsimiling the received computer data, the received computer data is converted into image data prior to transmission either to a designated remote facsimile machine or a designated remote computer via the telephone network.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will become more Apparent as the same become better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
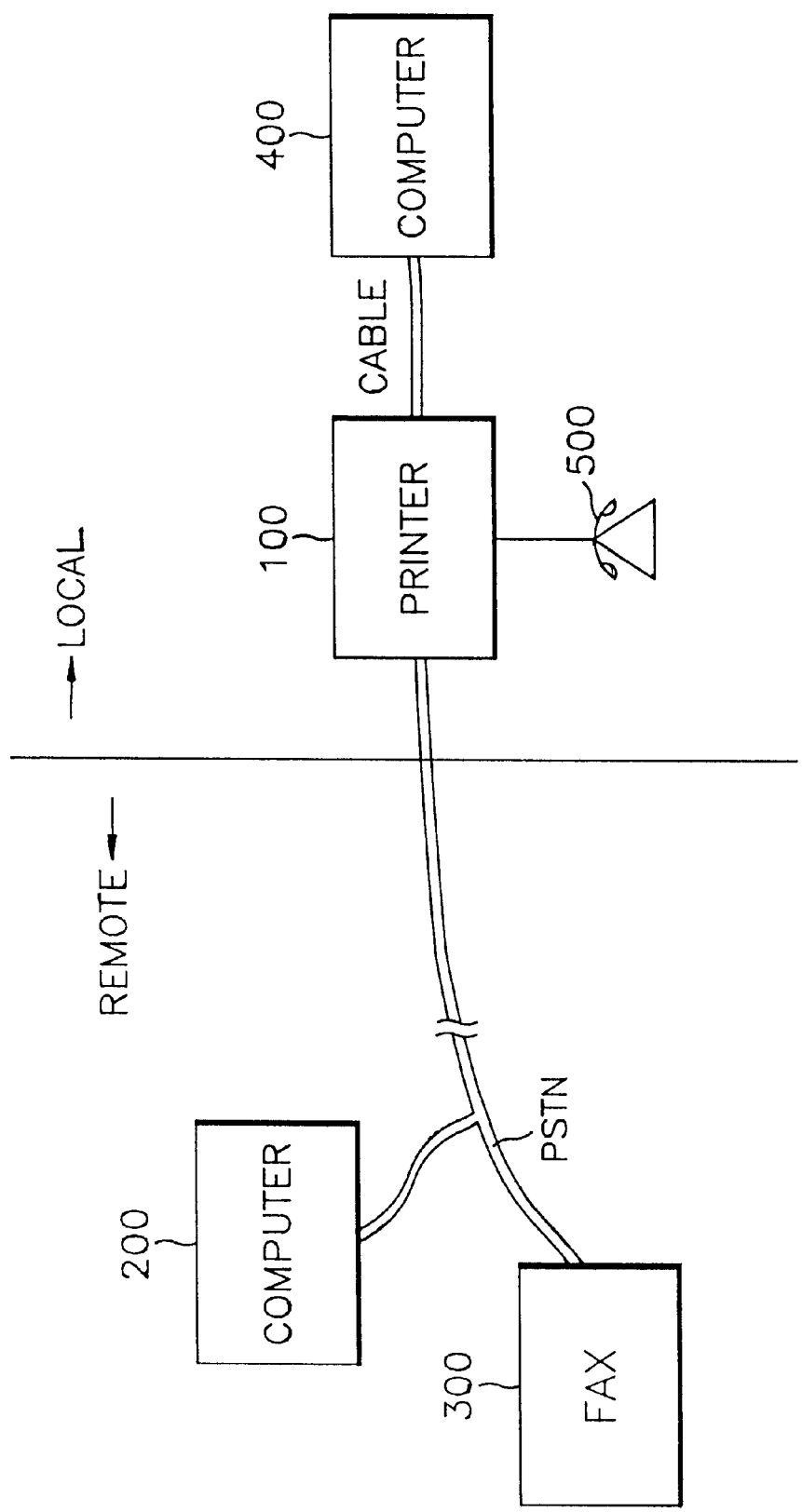
FIG. 1 is a schematic diagram of the communication system of the present invention.

Now referring to the drawings, FIG. 1 illustrates a communication system of the present invention. In FIG. 1, a data transmission/reception device is attached to an existing printer 100 for adapting the printer 100 to function as a facsimile machine, and for enabling the printer 100 not only to print both image signals from a host computer 400 and facsimile messages from a remote facility, such as either a remote facsimile machine 300 or a remote computer 200 via a private service telephone network (PSTN), but also transmit the facsimile messages received from either the remote facsimile machine 300 or the remote computer 200 to the host computer 400 for a visual display on a computer screen in accordance with the user's selection. The data transmission/reception device also adapts the printer 100 to facsimile the image signals from the host computer 400 directly to either the remote facsimile machine 300 or the remote computer 200. The telephone 500 is connected to the printer 100 to alert the user of an incoming facsimile message received either from the remote facsimile machine 300 or the remote computer 200 via the public subscriber telephone network.

Figure 2:
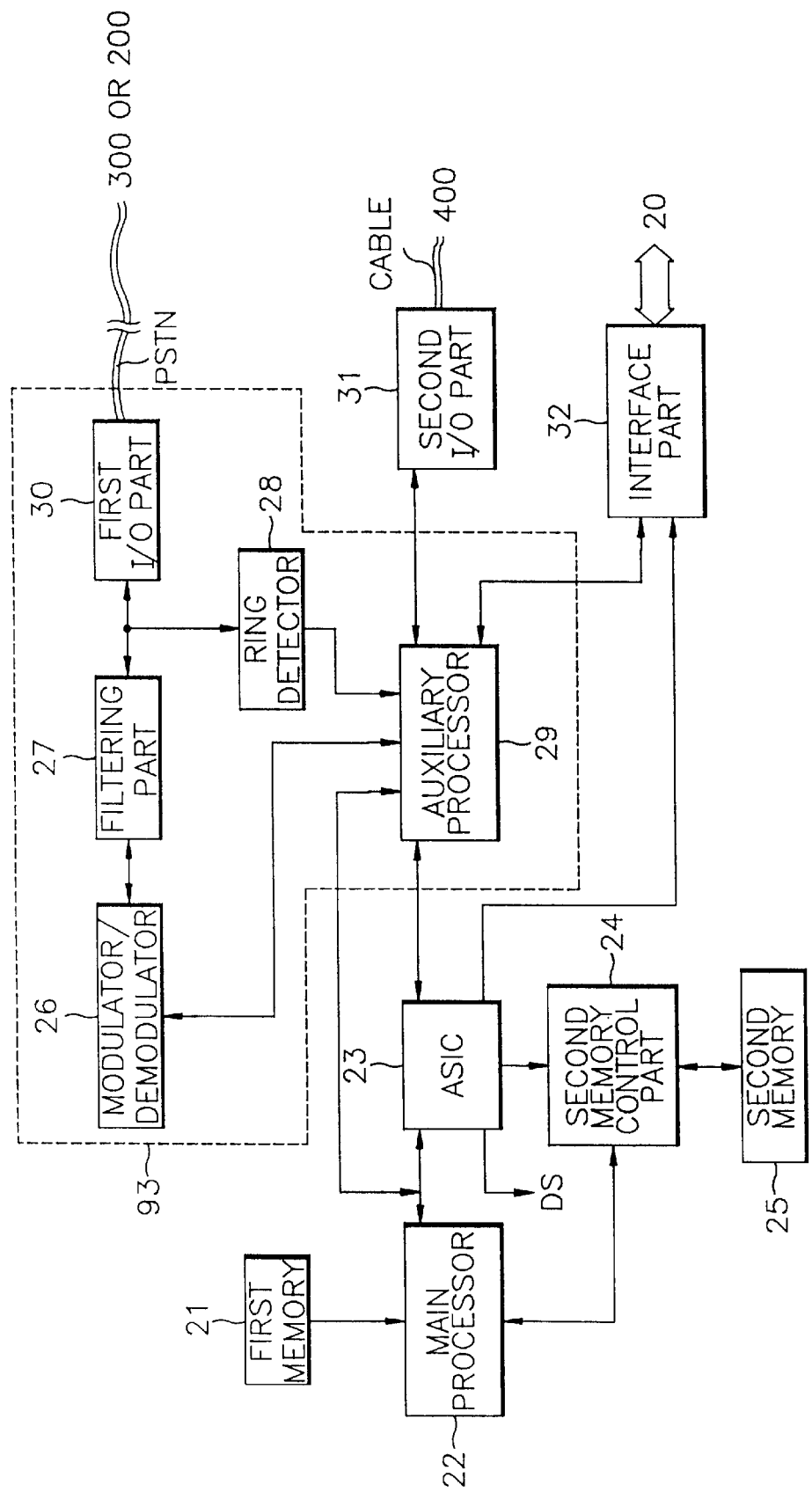
FIG. 2 is a diagram showing a construction of a data transmission/reception device according to the present invention.

FIG. 2 shows a preferred embodiment of the data transmission/reception device according to the present invention. The data transmission/reception device comprises a video control unit and a facsimile/modem transmission/reception unit 93. The video control part includes a prior art printer and a first memory 21, a main processor 22, an ASIC 23, a second memory control part 24, a second memory 25, a second input/output part 31 and an interface part 32. The first memory 21 is actually embodied as a ROM, and a second memory 25 as a DRAM.

The facsimile/modem transmission/reception unit which is newly added to a well-known electrophotographic printer according to the present invention, comprises a ring detector 28 for detecting a ring signal indicative of a facsimile reception; a modulator/demodulator 26 for demodulating the data transferred from a remote facsimile 300 and modulating the data supplied from a host computer 400 connected to the printer, a control part 22 and 29 for controlling the modulator/demodulator 26 to start the facsimile reception if the ring signal has been detected, and transmitting the data demodulated by the modulator/demodulator 26 to either an engine control part 20 for enabling direct printing, or to the host computer 400 in dependence upon whether the printer 100 is set in one of a print mode or a facsimile mode, and transmitting the data supplied from the local computer 400 to the modulator/demodulator 26 for modulation and transmission to either the remote facsimile machine 300 or the remote computer 200 in dependence upon whether the printer 100 is set in one of the print mode or the facsimile mode; an interface part 32 for interfacing with the engine control part 20 under control of the control part 22 and 29; and a filtering part 27 for removing noise before the demodulation or after the modulation. The engine control part 20 according to the present invention is adapted to serve both as a facsimile printer for printing facsimile signals, and a computer printer for printing computer signals. The interface part 32 according to the present invention also has other functions in the existing video control part. In this present invention, however, since the interface part 32 is also related to the operation of the facsimile/modem transmission/reception unit, it is regarded as an element of the facsimile/modem transmission/reception unit.

Even though the control part 22 and 29 can embody its function only by a main processor 22 of the video control unit, the present invention further comprises an auxiliary processor 29 designed to perform operation required for the driving the video control unit as well as the original operation of the control part. Alternatively, the auxiliary processor 20 can also be designed to perform only the original operation of the control part apart from the operation of the video control unit according to the present invention.

Figure 3:
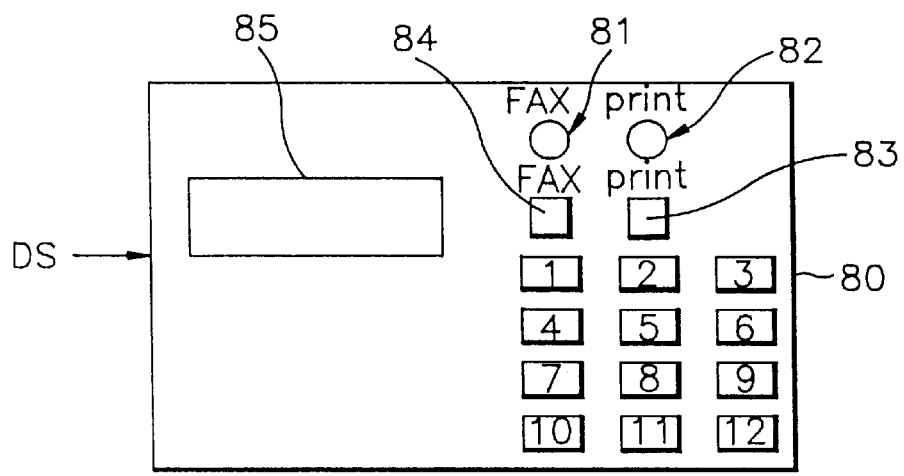
FIG. 3 is a diagram showing a construction of a display panel according to the present invention.

FIG. 3 shows a preferred embodiment of a display panel 80 located on the exterior surface of the printer 100 constructed according to the present invention. The display panel 80 includes set keys 83 and 84 for setting the printer to operate in either a facsimile mode or a print mode, and luminous diodes 81 and 82 for displaying which mode is set. The panel 80 further includes a liquid crystal display 85 for displaying respective operation modes on the data transmission/reception process, and a plurality of numerical keys 80 for inputting a telephone number. The reference numeral DS is a control signal supplied from ASIC 23 shown in FIG. 2.

Referring now to FIGS. 4A–4D in conjunction with FIGS. 2 and 3 of the present invention. FIGS. 4A–4D illustrate a flow chart of the data transmission/reception process according to the present invention. The operation performed in each step will be described in detail as follows.

Figure 4A:
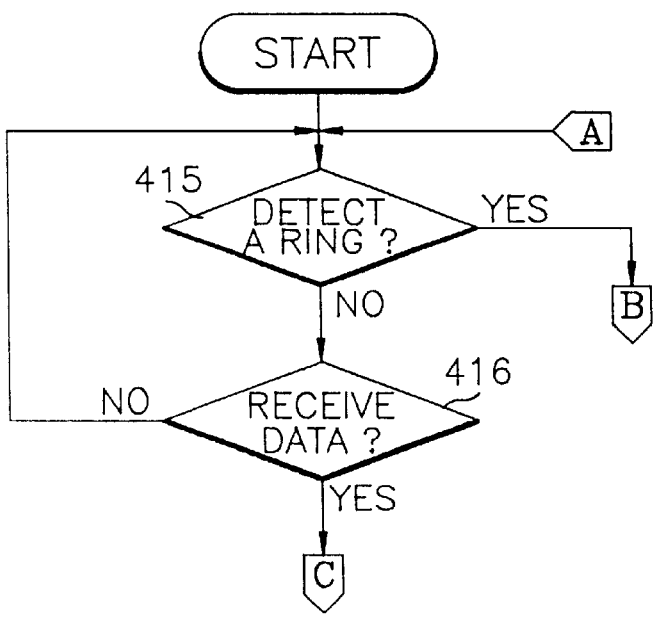
FIGS. 4A–4D illustrate a flow chart of the data transmission/reception process of a preferred embodiment of the present invention.

When the communication system is initialized and the main/auxiliary processors 22 and 29 are ready to operate, the ring detector 28 checks whether a ring signal indicative of an incoming facsimile message is detected from a public subscriber telephone network (PSTN) in step 415 as shown in FIG. 4A. If the ring signal is not detected, step 416 checks whether data is received from a host computer 400. The term "data reception" means that data received from the host computer 400 is to be facsimiled to either a remote facsimile machine 300 or a remote computer via the public subscriber telephone network, or to be printed directly by the printer.

After preparing a document with the host computer 400, the user first determines how to process the document, namely, whether he/she will process the document in a facsimile mode or in a print mode by simply making a selection on the panel 80 of the printer. Whether the printer is set in either the facsimile mode or the print mode, data is transmitted from the host is computer 400 to the printer via the cable. Once the data is received by the printer 100 in step 416 of FIG. 4A, the printer checks the mode set on the panel 80 in step 417 shown in FIG. 4B. If the panel 80 has been set in the print mode, the printer 100 prints the data transmitted from the host computer 400 directly in the same manner conventional to a typical printer. That is, the data to be printed is transferred from the host computer 400 to the auxiliary processor 29 via a second I/O part 31. The auxiliary processor 29 then receives each page of data to be printed in step 418, converts the data transferred from the host computer using a facsimile protocol program installed in the first memory 21 into bit map image data in step 419, and stores the bit map image data in the second memory 25. Once each page of data is processed, the auxiliary processor 29 transfers the image data to the engine control part 20 via ASIC 23 for subsequent printing in step 421. This way, all pages are printed by the repetition of these steps, and are then recorded at a journal in step 423.

Figure 4B:
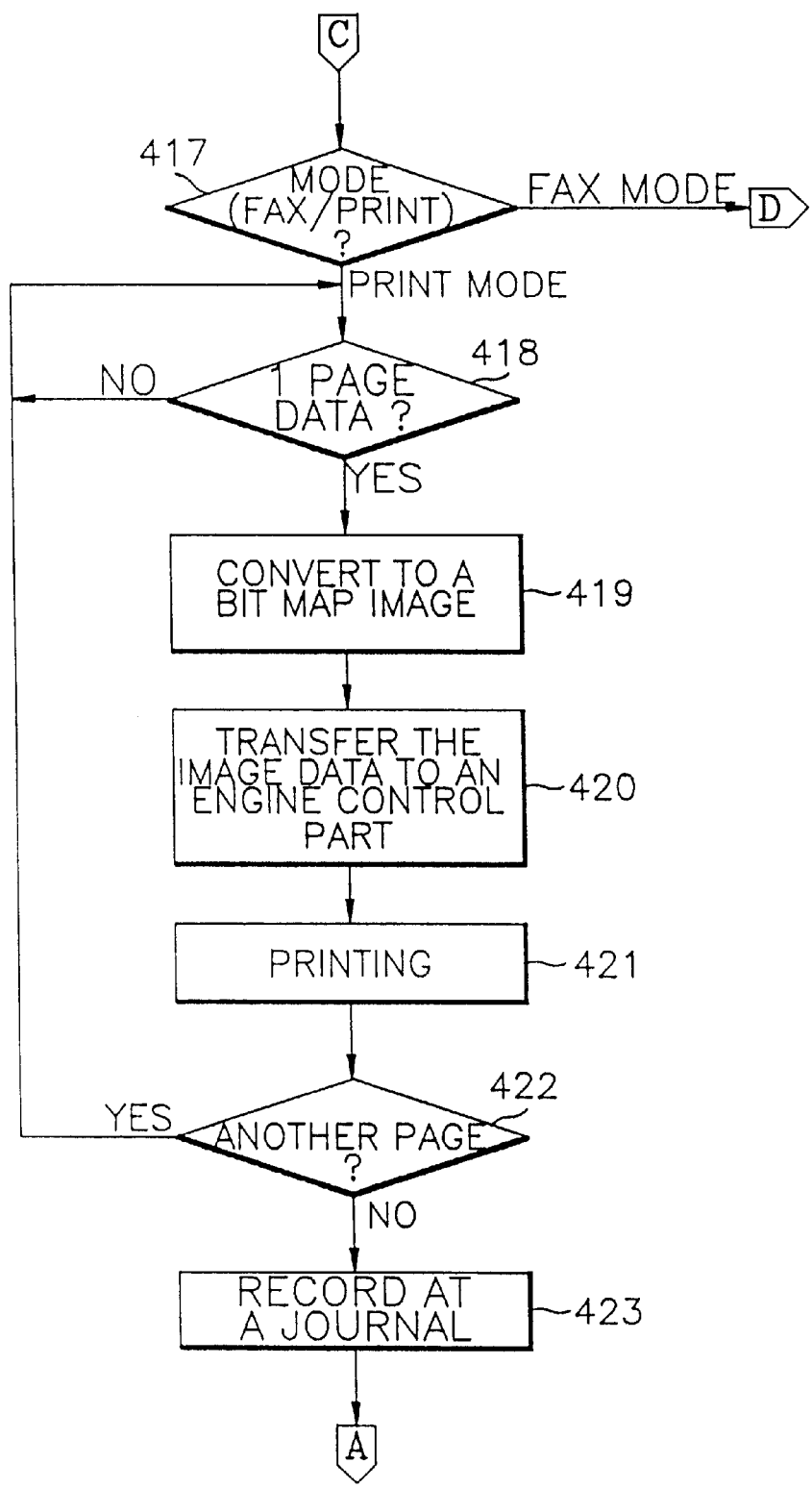

If, on the other hand, the panel 80 on the printer has been set in the facsimile mode in step 417 of FIG. 4B, the host computer 400 commands the printer 100 to act as a facsimile machine in order to receive data via a second I/O part 31 and transmit data received to either a remote facsimile machine 300 or a remote computer 200 via the public subscriber telephone network. Since data transferred to the printer 100 is not image data but normal printing data, the normal printing data should be converted into the bit map image data compatible for transmission to the remote facsimile machine 300 or the remote computer 200 via the public subscriber telephone network. The auxiliary processor 29 relies on the facsimile protocol program stored in the first memory 21 to convert the transmitted data to the bit map image data and then stores the bit map image data in the second memory 25. In addition, if the user inputs the facsimile number of a receiver party via the panel 80, the auxiliary processor 29 also relies on the facsimile protocol program stored in the first memory 21 for making connection with the receiver party. After the connection has been made, the image data stored in the second memory 25 is transmitted to the modulator/demodulator 26 one page at a time using the ASIC 23. The modulator/demodulator 26 modulates the image data in digital form into analog signals for transmission to either the remote facsimile machine 300 or the remote computer 200 via the filtering part 27 via the first I/O part 30 and the public subscriber telephone network.

Figure 4C:
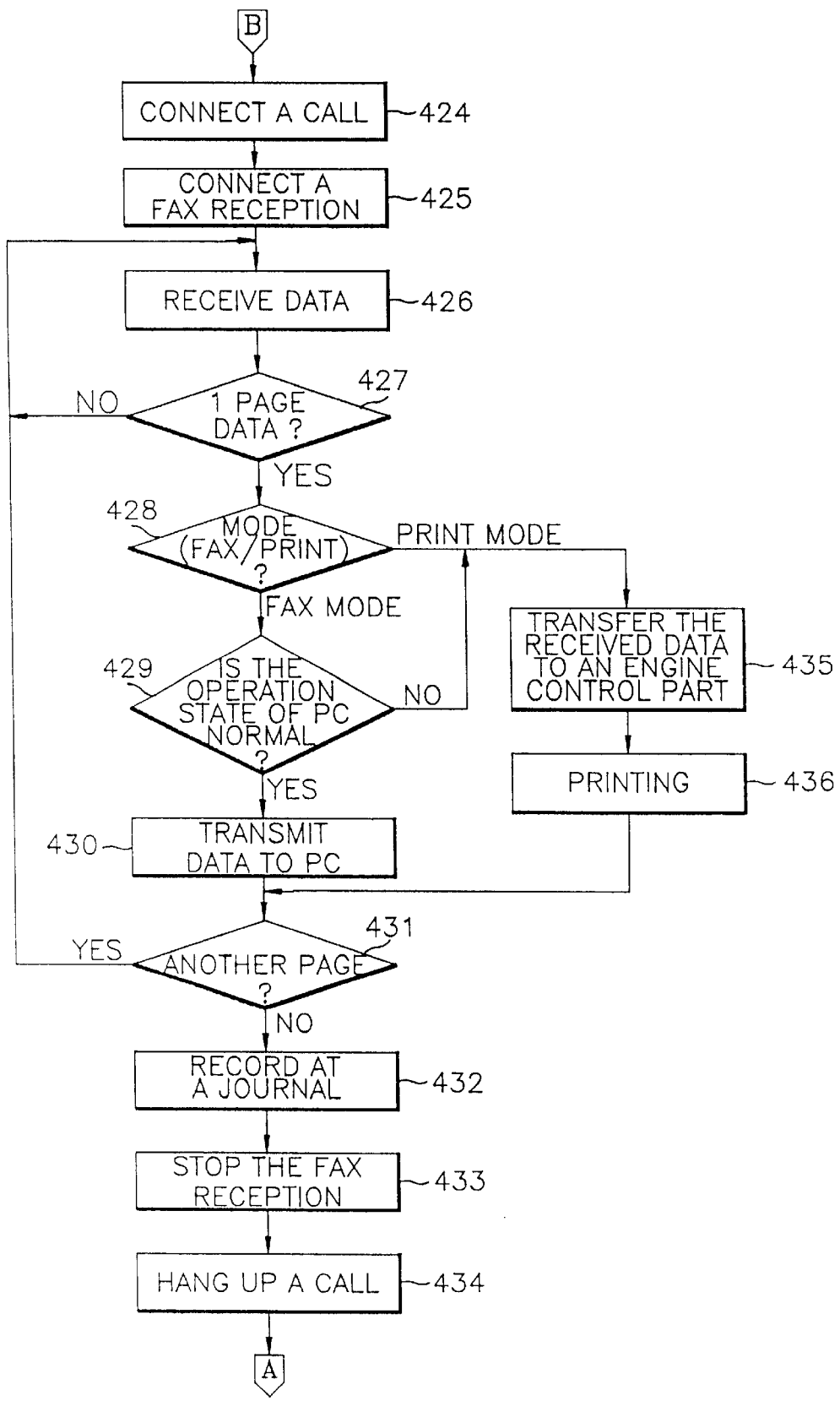
Figure 4D:
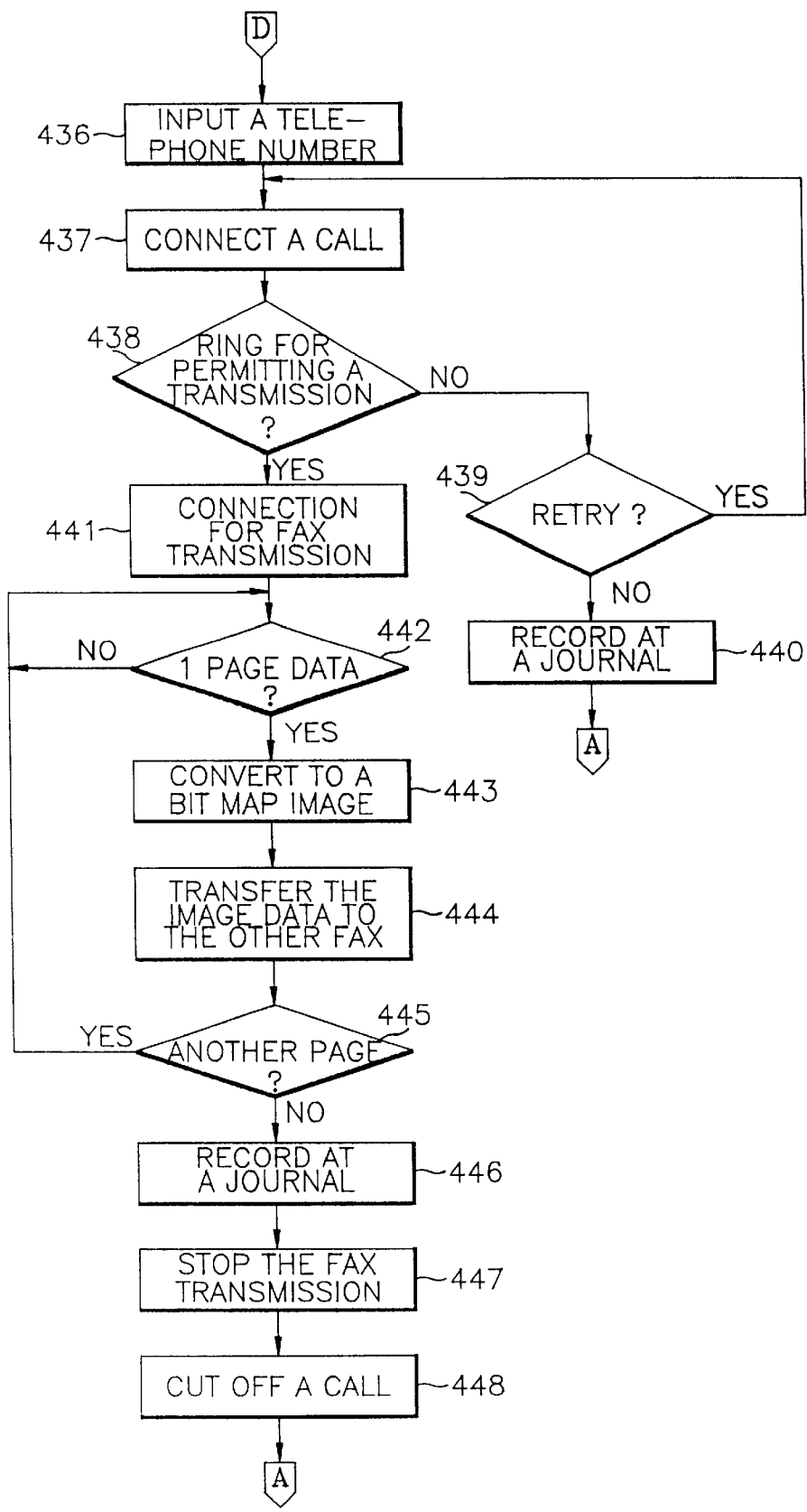

Specifically, in FIG. 4D, after the printer 100 determines that the panel 80 has been set in the facsimile mode, it waits for the user to input the facsimile number, i.e., telephone number, in step 436 in order to connect a call with either the remote facsimile machine 300 or the remote computer 200 via the public subscriber telephone network in step 437. If the call does not connect for the facsimile transmission, the printer 100 retries in step 439; otherwise, the non-connection is recorded at the journal in step 440 before the printer goes back to its initial state for detecting a ring signal indicative of an incoming facsimile message from a remote facility, such as a remote facsimile machine 300 or a remote computer 200 in step 415, or receiving data transmitted from a host computer 400 in step 416 shown in FIG. 4A. If the call is, however, connected, for the facsimile transmission in step 441, the auxiliary processor 29 receives each page of data at a time and converts the data received from the host computer 400 into bit map image data compatible for facsimile transmission to the remote facility in step 443 prior to transmission to the remote facility in step 444. After one page of data is transmitted to the remote facility, the auxiliary processor 29 seeks for a next page for the facsimile transmission in step 445. When all data received from the host computer 400 is transmitted to the remote facility, the result is recorded at the journal in step 446. Then, the facsimile transmission is stopped and a call is hung up in steps 447 and 448.

In a general PC-facsimile, the above-mentioned steps 436 to 448 of FIG. 4D are performed within the host computer 400, particularly, the process of converting facsimile data into image data, or image data into facsimile data. As mentioned in the background of the invention, this conversion requires significantly more time to print a file, and consequently results in the degradation of performance of the computer. According to the present invention, however, since the host computer 400 performs only the same operation as printing, the time required in the facsimile transmission of the computer is shortened. For this reason, the present invention offers significant improvement over that of the PC-facsimile as well as other conventional communication adapters.

Referring now to FIG. 4C, if the ring detector 28 of the data transmission/reception device installed in the printer 100 according to the present invention detects a ring signal indicative of an incoming facsimile message, the printer 100 interrupts and informs the auxiliary processor 29 that the ring has been detected. Once the auxiliary processor 29 senses that the ring has been detected, it accesses the facsimile transmission protocol program stored in the first memory 21 for making a call connection with the other party in steps 424 and 425. After the connection has been made, facsimile image data is received. The received facsimile image data is modulated from an analog format into a digital format via the filtering part 27 and the modulator/demodulator 26 and is then stored in the second memory 25 via the ASIC 23 in step 426. The printer 100 then determines the set mode of the panel 80 in step 428. If the panel 80 has been set in the facsimile mode, the auxiliary processor 29 checks the operation state of the host computer 400 in step 429, and then transmits the image data stored in the second memory 25 one page at a time to the host computer 400 via the second I/O part 31 in step 430, thereby enabling storage of the transferred image data in the memory device of the host computer 400. If, for any reasons, the host computer 400 is not operating normally or is not responsive to the printer 100, the auxiliary processor 29 transfers the facsimile image data received from the remote facility, such as a remote facsimile machine 300 or a remote computer directly to the engine control part 20 in step 435 for direct printing by the electrophotographic development process in step 436. Otherwise, after transmission of a first page of the facsimile image data to the host computer 400, the auxiliary processor 29 seeks for a next page of the facsimile image data for transmission to the host computer 400 in step 431. When all facsimile image data is transmitted to the host computer 400, the result is recorded at the journal in step 432 and the facsimile reception is stopped in step 433 and the call is hung up in step 434.

If, on the other hand, the panel 80 has been set in the print mode, the auxiliary processor 29 does not transmit the facsimile image data received from the remote facility to the host computer 400, but to the engine control part 20 as shown in step 435 for direct printing by the electrophotographic development process.

As described above, the method of processing a file transmitted from a remote facility, such as a remote facsimile machine 300 or a remote computer 200 varies depending upon whether the panel 80 has been set in either the print mode or the facsimile mode, similar to the method of processing documents made in the host computer 400. However, even when the panel 80 has been set in the facsimile mode, if the computer is turned off, the facsimile reception can not be performed. Consequently, in order to prevent such problem, in the preferred embodiment of the present invention, the transferred facsimile file is not stored at the memory device of the host computer 400, but is directly transferred to the engine control part 20 by the auxiliary processor 29 for direct printing (which corresponds to step 429 to step 435 of FIG. 4C). As mentioned earlier, if the printing or transmission has been completed through these steps, this is recorded at the journal in step 432. Then, the facsimile transmission is stopped and the call is hung up in steps 433 and 434.

Figure 5:
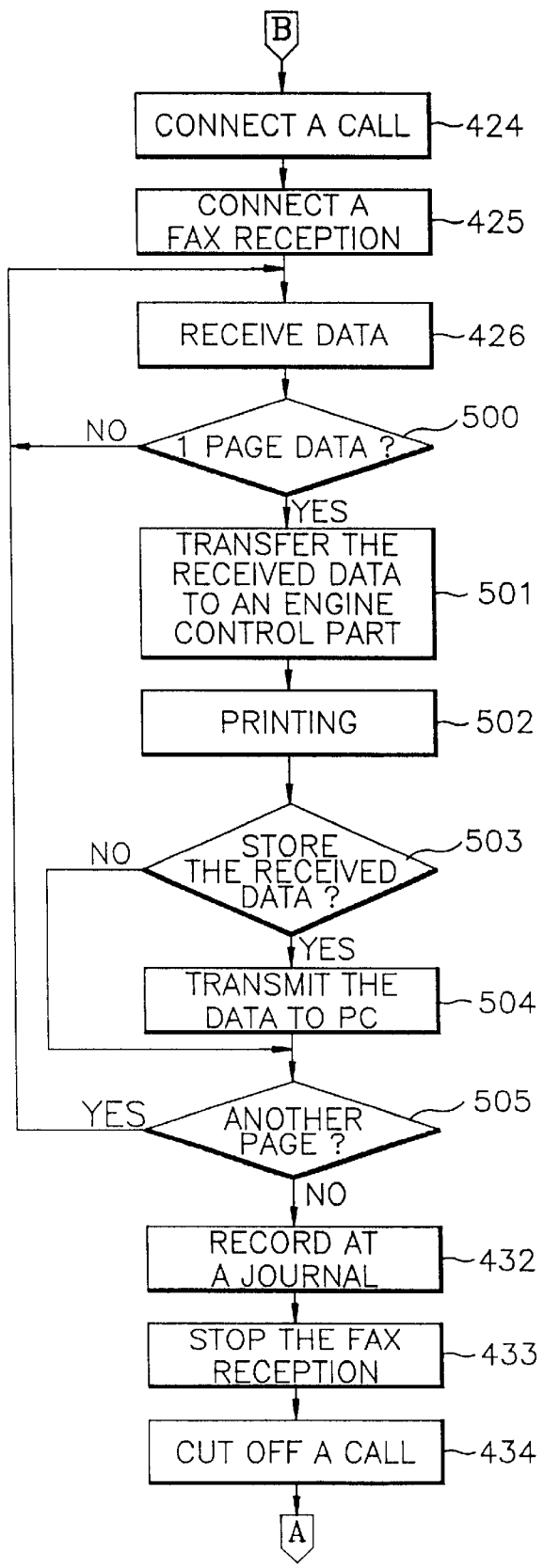
FIG. 5 illustrates a flow chart of the data transmission/reception process of another preferred embodiment of the present invention.

FIG. 5 illustrates another preferred embodiment of the present invention. In FIG. 5, after a ring indicative of an incoming facsimile message is detected in step 415 shown in FIG. 4A, the data received from the remote facility is first printed in step 502, stored in step 503 and then transmitted to the host computer 400 in step 504. FIG. 5 actually illustrates a modification of steps 424 to 436 of FIG. 4C. That is, regardless whether the printer has been set in either the print mode or the facsimile mode, the printer automatically prints the data received from the remote facility, stores and then transmits the received data to the host computer 400 on a page-by-page basis until all pages are printed and transmitted to the host computer 400.

As described above, in the present invention the printing and facsimile transmission is performed in the same way, and during the facsimile transmission, the image data format is performed within the printer, not in the computer or the scanner as is performed in the PC-facsimile or the PP-facsimile, which would result in reducing the cost required in embodying respective functions. In this case, the computer performs the facsimile transmission in the same way as the typical printing, so that additional time required in the facsimile transmission is not needed, thereby achieving high computer performance when compared to the PC-facsimile. The simplified data transmission/reception device according to the present invention the printer to function as a facsimile machine without changing the structure of the printer, and enables the printer not only to print both data from a host computer and facsimile data from either a remote facsimile machine or a remote computer, but also to transmit facsimile data received from either a remote facsimile machine or a remote computer to a host computer via the public subscriber telephone network for a visual display on a computer screen. The data transmission/reception data also enables the printer not only to print data directly from a host computer, but also to facsimile image data from a host computer directly to either a remote facsimile machine or a remote computer, thereby eliminating the necessity of first printing a document, i.e., image signals from a host computer on a recording paper and then scanning the printed recording paper into a host facsimile machine in order to transfer the document to a remote facsimile machine via the public subscriber telephone network as is required in the conventional art. Additionally, the data transmission/reception device of the present invention also enables the printer to facsimile a document directly from a host computer to either a remote facsimile machine or a remote computer via a private service telephone network without requiring a separate scanner, thereby eliminating data distortion occurring during the scanning of the document.

While the present invention has been described in detail with reference to the above embodiments. It will, however, be apparent to a person skilled in the art that various modifications in the specific matter of the present invention are possible, without departing from the scope of the invention.

What is claimed is:

1. A data transmission and reception device for use in a printer including a printer engine adaptable to print facsimile data from a remote facility and computer data from a host computer, said data transmission and reception device comprising:

means for detecting a ring signal indicative of an incoming facsimile reception;

first input/output means for enabling reception of facsimile data transmitted from said remote facility via a telephone network, and for enabling transmission of computer data received from a host computer to said remote facility;

second input/output means for enabling reception of said computer data to be transmitted to said remote facility via said telephone network, and for enabling transmission of said facsimile data received from said remote facility to said host computer;

modulator/demodulator means for demodulating received facsimile data from said remote facility, and for modulating received computer data from said host computer;

control means for controlling said modulator/demodulator means to start the facsimile reception when said ring signal is detected, for controlling the transmission of demodulated facsimile data to one of said printer engine for direct printing and said host computer via said second input/output means, and controlling the transmission of the received computer data supplied from said host computer to one of said printer engine for direct printing and said modulator/demodulator means for modulation and subsequent transmission to said remote facility via said first input/output means, in dependence upon a determination of whether said printer is set in one of a print mode and a facsimile mode; and means for interfacing with said printer engine under the control of said control means.

2. The data transmission and reception device of claim 1, further comprising:

filtering means for removing noise before demodulation of the received facsimile data from said remote facility, and after modulation of the received computer data from said host computer.

3. The data transmission and reception device of claim 1, further comprising:

means for printing said demodulated facsimile data directly on a succession of individual sheet of recording papers, when said printer is set in said print mode; and means for transferring said demodulated facsimile data to said second input/output means for transmission to said host computer for a visual display on a screen, when said printer is set in said facsimile mode.

4. The data transmission and reception device of claim 1, further comprising:

means for printing the received computer data supplied from said host computer directly on a succession of individual sheet of recording papers when said printer is set in said print mode; and means for transferring the received computer data supplied from said host computer to said modulating/demodulating means for modulation and then to said first input/output means for transmission to said remote facility, when said printer is set in said facsimile mode.

5. The data transmission and reception device of claim 3, further comprising:

filtering means for removing noise before demodulation of the received facsimile data from said remote facility and after modulation of the received computer data from said host computer.

6. The data transmission and reception device of claim 4, further comprising:

filtering means for removing noise before demodulation of the received facsimile data from said remote facility, and after modulation of the received computer data from said host computer.

7. A method for transferring facsimile data in a printer between a host computer and one of a remote computer and a remote facsimile machine, said method comprising the steps of:

detecting a ring signal indicative of facsimile data being transmitted from one of said remote computer and said remote facsimile machine;

receiving said facsimile data transmitted from one of said remote computer and said remote facsimile machine;

determining whether said printer is set in one of a print mode and a facsimile mode;

printing the received facsimile data, when said printer is set in said print mode; and transferring the received facsimile data to said host computer for a visual display on a computer screen, when said printer is set in said facsimile mode.

8. The method of claim 7, further comprising the step of checking the operation of said host computer prior to transferring the received facsimile data to said host computer, when said printer is set in said facsimile mode.

9. The method of claim 8, further comprising the step of printing the received facsimile data, when said host computer does not respond even though said printer is set in said facsimile mode.

10. A method for transferring facsimile data in a printer between a host computer and one of a remote computer and a remote facsimile machine via a telephone network, said method comprising the steps of:

detecting a ring signal indicative of facsimile data being transmitted from one of said remote computer and said remote facsimile machine;

receiving a first page of said facsimile data transmitted from one of said remote computer and said remote facsimile machine;

printing said first page of the received facsimile data;

storing said first page of the received facsimile data in an interface;

transmitting to said host computer said first page of the stored facsimile data for a visual display on a computer screen; and repeating steps of receiving facsimile data, printing said facsimile data and storing said facsimile data until said facsimile data of all pages is received.

11. A method for transferring computer data in a printer between a host computer and one of a remote computer and a remote facsimile machine via a telephone network, said method comprising the steps of:

receiving computer data from said host computer for printing and for transmission to one of said remote computer and said remote facsimile machine;

determining whether said printer is set in one of a print mode and a facsimile mode;

printing received computer data when said printer is set in said print mode;

transmitting said received computer data to one of said remote computer and said remote facsimile machine in accordance with a telephone number, when said printer is set in said facsimile mode.

12. The method of claim 11, further comprising the steps of:

inputting said telephone number for transmitting the received computer data; and converting a unit amount of the received computer data into image data and then transmitting said image data to one of said remote facsimile machine and said remote computer, when said printer is connected to one of said remote facsimile machine and said remote computer via said telephone network.

13. A method for transferring facsimile and computer data in a printer between a host computer and one of a remote computer and a remote facsimile machine via a telephone network, said method comprising the steps of:

detecting a ring signal indicative of facsimile data being transmitted from one of said remote computer and said remote facsimile machine;

receiving said facsimile data transmitted from one of said remote computer and said remote facsimile machine upon detection of said ring signal;

determining whether said printer is set in one of a print mode and a facsimile mode;

printing the received facsimile data when said printer is set in said print mode;

transferring the received facsimile data to said host computer when said printer is set in said facsimile mode;

receiving computer data from said host computer for printing and for transmission to one of said remote computer and said remote facsimile machine, when said ring signal has not been detected;

printing the received computer data when said printer is set in said print mode; and transmitting the received computer data to one of said remote computer and said remote facsimile machine in accordance with a telephone number, when said printer is set in said facsimile mode.

14. The method of claim 13, further comprising the step of checking the operation of said host computer prior to transferring said received facsimile data to said host computer, when said printer is set in said facsimile mode.

15. The method of claim 13, further comprising the step of printing the received facsimile data when said host computer does not respond even though said printer is set in said facsimile mode.

16. The method of claim 13, further comprising the steps of:
- inputting said telephone number; and
- converting a unit amount of said received computer data into image data and then transmitting said image data to one of said remote facsimile machine and said remote computer, when said printer is connected to one of said remote facsimile machine and said remote computer via said telephone network.

17. A printer adaptable to print computer signals received from a host computer and facsimile signals received from a remote facility, and to transmit one of said computer signals received from said host computer to said remote facility via a telephone network and said facsimile signals received from said remote facility to said host computer via said telephone network, said printer comprising:
- a facsimile modem unit connected to telephone lines of said telephone network to receive said facsimile signals transmitted from said remote facility and transmit received computer signals from said host computer to said remote facility;
- a video control unit connected to cable lines of said host computer, to receive said computer signals provided from said host computer and to transfer the received computer signals to said facsimile modem unit for transmission to said remote facility via said telephone network, and adapted to transmit received facsimile signals to said host computer via said cable lines; and
- printer means for printing one of said received computer signals from said host computer and said received facsimile signals from said remote facility in dependence upon whether said printer is set in one of a print mode and a facsimile mode.

18. The printer of claim 17, wherein said facsimile modem unit transmits the received computer signals to said remote facility via said telephone network, and said video control unit transmits the received facsimile signals to said host computer via said cable lines, when said printer is set in said facsimile mode.

19. The printer of claim 17, wherein said facsimile modem unit comprises:
- means for detecting a ring signal indicative of reception of facsimile signals;
- first input/output means for receiving said facsimile signals transmitted from said remote facility via said telephone network, and transmitting the received computer signals from said host computer to said remote facility;
- modulator/demodulator means for providing demodulated signals by demodulating the received facsimile signals, and for providing modulated signals to be transmitted to said remote facility via said telephone network by modulating the received computer signals from said host computer; and
- first processor means for controlling said modulator/demodulator means to begin demodulation of the received facsimile signals when said ring signal is detected, transferring said demodulated signals to one of said printer means for printing and said video control unit for transmission to said host computer via said cable lines, and transferring the received computer signals to said modulator/demodulator means for modulation and transmission to said remote facility, in dependence upon a determination of whether said printer is set in one of a print mode and a facsimile mode.

20. The printer of claim 19, wherein said video control unit comprises:
- second input/output means for receiving said computer signals provided from said host computer to be transmitted to said remote facility, and transmitting the received facsimile signals from said remote facility to said host computer;
- first memory means for storing a facsimile protocol program enabling conversion of the received facsimile signals into first image signals compatible for transmission to said host computer and enabling conversion of the received computer signals into second image signals compatible for transmission to said remote facility;
- second memory means for storing said first and second image signals;
- second processor means for controlling operation of said video control unit; and
- means for interfacing with said printer means and enabling said printer means to print said received computer signals directly from said host computer and said received facsimile signals directly from said remote facility, when said printer is set in said print mode in response to one of detection of said ring signal and reception of said computer signals from said host computer.

21. The printer of claim 19, wherein said facsimile modem unit further comprises filtering means for removing noise before demodulation of the received facsimile signals from said remote facility, and after modulation of the received computer signals from said host computer.

22. The printer of claim 20, wherein said facsimile modem unit transmits the received computer signals to said remote facility via said telephone network, and said video control unit transmits the received facsimile signals to said host computer via said cable lines, when said printer is set in said facsimile mode.

* * * * *